(12) United States Patent
Zhang et al.

(10) Patent No.: US 7,200,237 B2
(45) Date of Patent: Apr. 3, 2007

(54) METHOD AND SYSTEM FOR REMOTELY UPGRADING A HEARING AID DEVICE

(75) Inventors: Chaoying Zhang, Sunnyvale, CA (US); Zezhang Hou, Cupertino, CA (US)

(73) Assignee: Apherma Corporation, Cupertino, CA (US)

( * ) Notice: Subject to any disclaimer, the term of this patent is extended or adjusted under 35 U.S.C. 154(b) by 271 days.

(21) Appl. No.: 10/037,766

(22) Filed: Oct. 23, 2001

(65) Prior Publication Data

US 2002/0054689 A1   May 9, 2002

Related U.S. Application Data

(60) Provisional application No. 60/242,089, filed on Oct. 23, 2000.

(51) Int. Cl.
*H04R 25/00* (2006.01)
(52) U.S. Cl. .................. 381/60; 381/312; 381/314
(58) Field of Classification Search .................. 381/58, 381/60, 314, 323, 313, 312; 379/102.1, 52; 700/65, 86–87; 709/217, 219, 218; 717/168–178; 600/559; 73/585
See application file for complete search history.

(56) References Cited

U.S. PATENT DOCUMENTS 5,226,086 A    7/1993  Platt
6,467,088 B1 * 10/2002 alSafadi et al. ............. 717/173
6,469,742 B1 * 10/2002 Trovato
6,556,686 B1 *  4/2003 Weidner
6,615,405 B1 *  9/2003 Goldman

FOREIGN PATENT DOCUMENTS

| DE | 196 00 234 A1 | 7/1997 |
| WO | WO 97/17819 | 5/1997 |
| WO | WO 00/22874 | 4/2000 |

OTHER PUBLICATIONS

Written Opinion for PCT/US01/46095.

* cited by examiner

*Primary Examiner*—Suhan Ni (57) ABSTRACT

Improved approaches are disclosed to update existing hearing devices by downloading software resources over a network from a remote server to a local client. The software resources are then stored in the existing hearing devices, thereby upgrading the functionality or operation of the existing hearing devices. Accordingly, existing hearing devices are able to be upgraded at convenient locations in a largely automated fashion. The invention is particularly useful for hearing aids or other sound systems for the hearing impaired.

31 Claims, 8 Drawing Sheets

METHOD AND SYSTEM FOR REMOTELY UPGRADING A HEARING AID DEVICE

CROSS-REFERENCE TO RELATED APPLICATION

This application claims the benefit of U.S. Provisional Application No. 60/242,089, filed Oct. 23, 2000, and entitled "PROTOCOL FOR REMOTELY UPGRADING HEARING AID," the contents of which is hereby incorporated by reference.

BACKGROUND OF THE INVENTION

1. Field of the Invention

The present invention relates to digital hearing aids and, more particularly, to programming or upgrading hearing aid devices.

2. Description of the Related Art

Simply put, a hearing aid is basically a sound amplifier to be placed at or in the ear canal to help people with peripheral hearing loss. However, the actual implementation of how the sound is amplified can be extremely complicated. The delicacy of the amplification is due to the fact that the human hearing process is accomplished through a remarkably complex system, and is designed to handle a very complex hearing environment. For example, a person with normal hearing can detect either a very soft or endure a very loud sound with a range of sound pressure level over 100 dB. This is accomplished through a compressive amplification scheme which amplifies the soft sound and compresses the loud sound. Further, in a very noisy environment, such as a cocktail party, a person's hearing functioning normally can not only identify the direction of a conversing sound source, but also selectively filter the sound to perceive speech signals. This example briefly introduces three of the main fields of today's hearing aid research and development. These three fields are: compressive amplification, noise reduction and detection of sound source location. In the case of hearing impairment, these inherent functions are typically damaged and thus need to be compensated. With today's technological progress in digital signal processing based hearing aids (i.e., digital hearing aids), the development in these areas has been quite rapid in recent years.

Unfortunately, however, the rapid development presents a problem with upgrading existing hearing aids. Conventionally, once hearing aids are manufactured or fitted, they are fixed for all practical purposes. Usually this means that for a user to take advantage of recent technological advance that have occurred since they purchased their hearing aid, they must purchase a new hearing aid. In the case of digital hearing aids, the existing hearing aid could perhaps be alternatively returned to the hearing aid manufacturer to be re-programmed and thus upgraded to include recent technological advances. However, manufacturers normally prefer to sell a new hearing aid as opposed to upgrading older versions. In any case, there are no means currently available to promptly and conveniently upgrade hearing aid devices without the heavy involvement of manufacturers to take the old hearing devices back.

Thus, there is a need for improved techniques for updating existing hearing aid devices.

SUMMARY OF THE INVENTION

Broadly speaking, the invention relates to improved approaches to update existing hearing devices by downloading software resources over a network from a remote server to a local client. The software resources are then stored in the existing hearing devices, thereby upgrading the functionality or operation of the existing hearing devices. Accordingly, existing hearing devices are able to be upgraded at convenient locations in a largely automated fashion. The invention is particularly useful for hearing aids or other sound systems for the hearing impaired.

The invention can be implemented in numerous ways, including as a method, system, apparatus, device, and computer readable medium. Several embodiments of the invention are discussed below.

As a method for upgrading a hearing aid device, one embodiment of the invention includes at least the acts of: reading device information from the hearing aid device; sending the device information to a hearing aid upgrade server via a network; subsequently receiving upgrade data from the hearing aid upgrade server via the network; and upgrading the hearing aid device based on the upgrade data.

As a method for upgrading a hearing aid device, another embodiment of the invention includes at least the acts of: connecting the hearing aid device to a hearing aid programming system; electronically reading device information from the hearing aid device to the hearing aid programming system; coupling the hearing aid programming system to a remote hearing aid upgrade server through a network; requesting upgraded software for the hearing aid device from the remote hearing aid upgrade server based on the device information; receiving, at the hearing aid programming system, upgraded software for the hearing aid device from the remote hearing aid upgrade server through the network; and installing the upgraded software for the hearing aid device in the hearing aid device, whereby the hearing aid device thereafter operates in accordance with the upgraded software.

As a method for providing software to upgrade a hearing aid device from a remote hearing aid server, one embodiment of the invention includes at least the acts of: receiving a request from a requesting machine to upgrade software for the hearing aid device; receiving device information for the hearing aid device from the requesting machine; determining appropriate upgraded software for the hearing aid device based on the device information; and sending the appropriate upgraded software to the requesting device, whereby the appropriate upgraded software is thereafter installed on the hearing aid device.

As a computer readable medium including at least computer program code for upgrading a hearing aid device, one embodiment of the invention includes at least: computer program code for reading device information from the hearing aid device; computer program code for sending the device information to a hearing aid upgrade server via a network; computer program code for subsequently receiving upgrade data from the hearing aid upgrade server via the network; and computer program code for upgrading the hearing aid device based on the upgrade data.

As a computer readable medium including at least computer program code for upgrading a hearing aid device, another embodiment of the invention includes at least: computer program code for connecting the hearing aid device to a hearing aid programming system; computer program code for electronically reading device information from the hearing aid device to the hearing aid programming system; computer program code for coupling the hearing aid programming system to a remote hearing aid upgrade server through a network; computer program code for requesting upgraded software for the hearing aid device from the remote hearing aid upgrade server based on the device information; computer program code for receiving, at the hearing aid programming system, upgraded software for the hearing aid device from the remote hearing aid upgrade server through the network; and computer program code for installing the upgraded software for the hearing aid device in the hearing aid device, whereby the hearing aid device thereafter operates in accordance with the upgraded software.

As a computer readable medium including at least computer program code for upgrading a hearing aid device from a remotely located hearing aid server, one embodiment of the invention includes at least: computer program code for receiving a request from a requesting machine to upgrade the hearing aid device; computer program code for receiving device information for the hearing aid device from the requesting machine; computer program code for determining appropriate upgrade data for the hearing aid device based on the device information; and computer program code for sending the appropriate upgrade data to the requesting device, whereby the appropriate upgrade data is thereafter installed on the hearing aid device.

As a hearing aid upgrade server apparatus, one embodiment of the invention includes at least: means for receiving a request from a requesting machine to upgrade software for the hearing aid device; means for receiving device information for the hearing aid device from the requesting machine; means for determining appropriate upgraded software for the hearing aid device based on the device information; and means for sending the appropriate upgraded software to the requesting device, whereby the appropriate upgraded software is thereafter installed on the hearing aid device.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to improved approaches to update existing hearing devices by downloading software resources over a network from a remote server to a local client. The software resources are then stored in (e.g., installed on) the existing hearing devices, thereby upgrading the functionality or operation of the existing hearing devices. Accordingly, existing hearing devices are able to be upgraded at convenient locations in a largely automated fashion. The invention is particularly useful for hearing aids or other sound systems for the hearing impaired.

Digital hearing aids have their functionality controlled by the software (e.g., algorithms) stored in their memory. The software can be downloaded into the digital hearing aid by a programming device. Fitting a hearing aid is a process to be done by a hearing aid dispenser to select and then adjust all functions of the hearing aid for a hearing impaired person according to the person's specific hearing loss. This fitting procedure is often done with the assistance of fitting software operating on a computer. According to the invention, new, upgraded or replacement software from a manufacturer can be downloaded over a network and stored in the digital hearing aid. Hence, the digital hearing aid thereafter operates with improved functionality and operationally without the need for any hardware modifications. Consequently, such modifications can be achieved not only remotely from any manufacturer, but also conveniently during a fitting session by a hearing aid dispenser.

Embodiments of the invention are discussed below with reference to FIGS. 1–5B. However, those skilled in the art will readily appreciate that the detailed description given herein with respect to these figures is for explanatory purposes as the invention extends beyond these limited embodiments.

Figure 1:
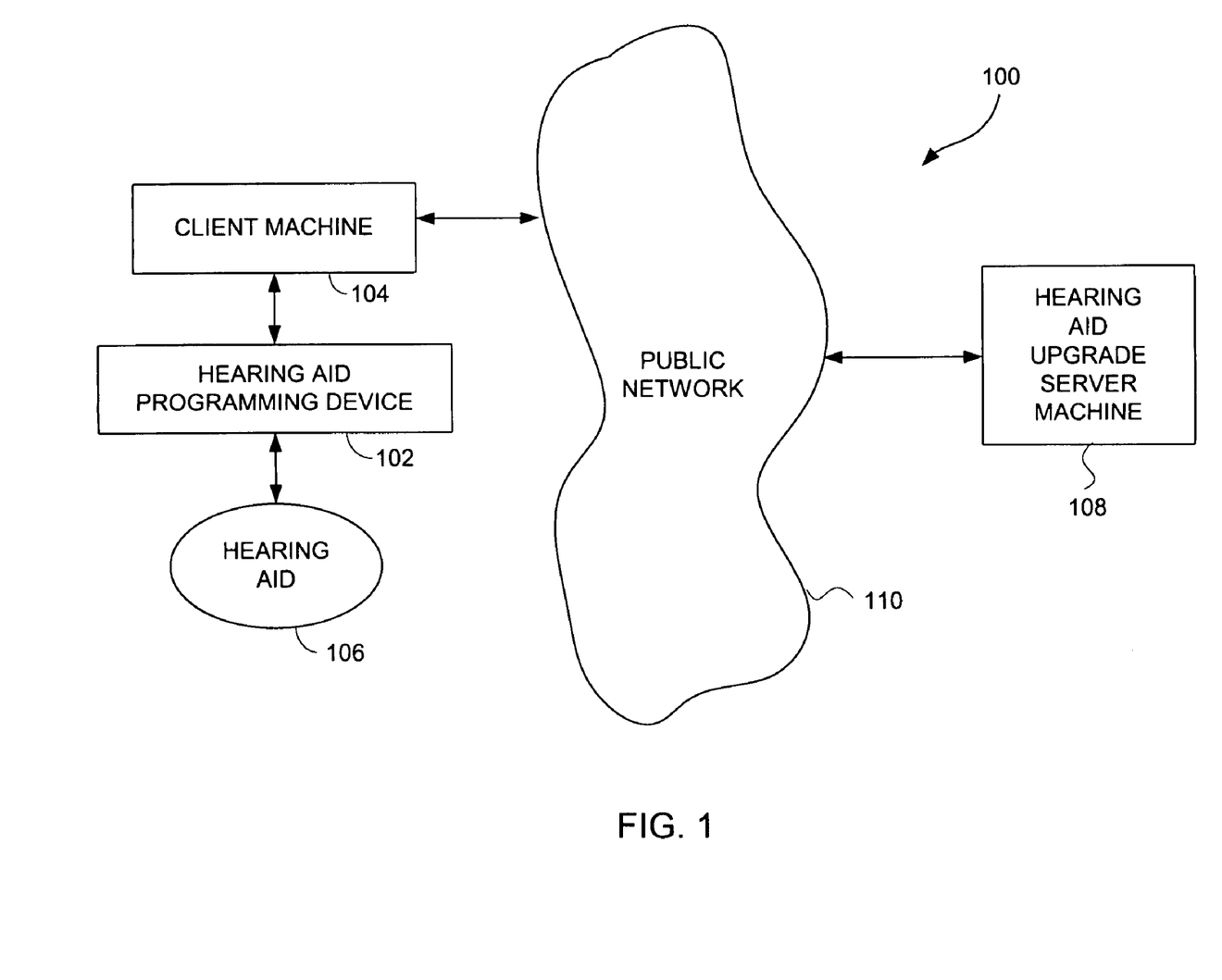
FIG. 1 is a block diagram of a hearing aid upgrade system according to one embodiment of the invention.

FIG. 1 is a block diagram of a hearing aid upgrade system 100 according to one embodiment of the invention. The hearing aid upgrade system 100 includes a hearing aid programming device 102. The hearing aid programming device 102 is coupled to a client machine 104. In one embodiment, the client machine is a computer, such as a personal computer. The hearing aid programming device 102 can also be coupled to one or more hearing aids 106 which amplify sounds for hearing impaired users. The hearing aids 106 are digital hearing aids that are programmable. In particular, the hearing aid programming device 102 can program the hearing aids. In one embodiment, the hearing aids include non-volatile memory (e.g., EEPROM, FLASH, etc.) that can be electronically programmed or rewritten. Typically, the hearing aid programming device 102, the client machine 104 and the hearing aid 106 are all physically located at a hearing aid dispensing office. Although the client machine 104 and the hearing aid programming device 102 are shown as separate units, it should be understood that they can be combined into a single unit.

The hearing aid upgrade system 100 also includes a hearing aid upgrade server machine 108. The hearing aid upgrade server machine 108 is remotely located with respect to the hearing aid dispensing office. Typically, the hearing aid upgrade server machine 108 is associated with one or more manufacturers of hearing aid devices. The hearing aid upgrade server machine 108 is able to communicate with the client machine 104 (e.g., at the hearing aid dispensing office) through a public network 110. In one embodiment, the public network 110 includes the Internet.

According to the invention, the hearing aid 106 can be upgraded with software resources provided at the hearing aid upgrade server machine 108. More particularly, the hearing aid upgrade server machine 108 transmits the appropriate software resources to the client machine 104. The client machine 104 then instructs the hearing aid programming device 102 to program the hearing aid 106 in accordance with the software resources. The hearing aid programming device 102 then programs the hearing aid 106. Once programmed, the digital hearing aid 106 operates in accordance with new functionality that has been provided by the software resources that have been programmed into the hearing aid 106.

Figure 2:
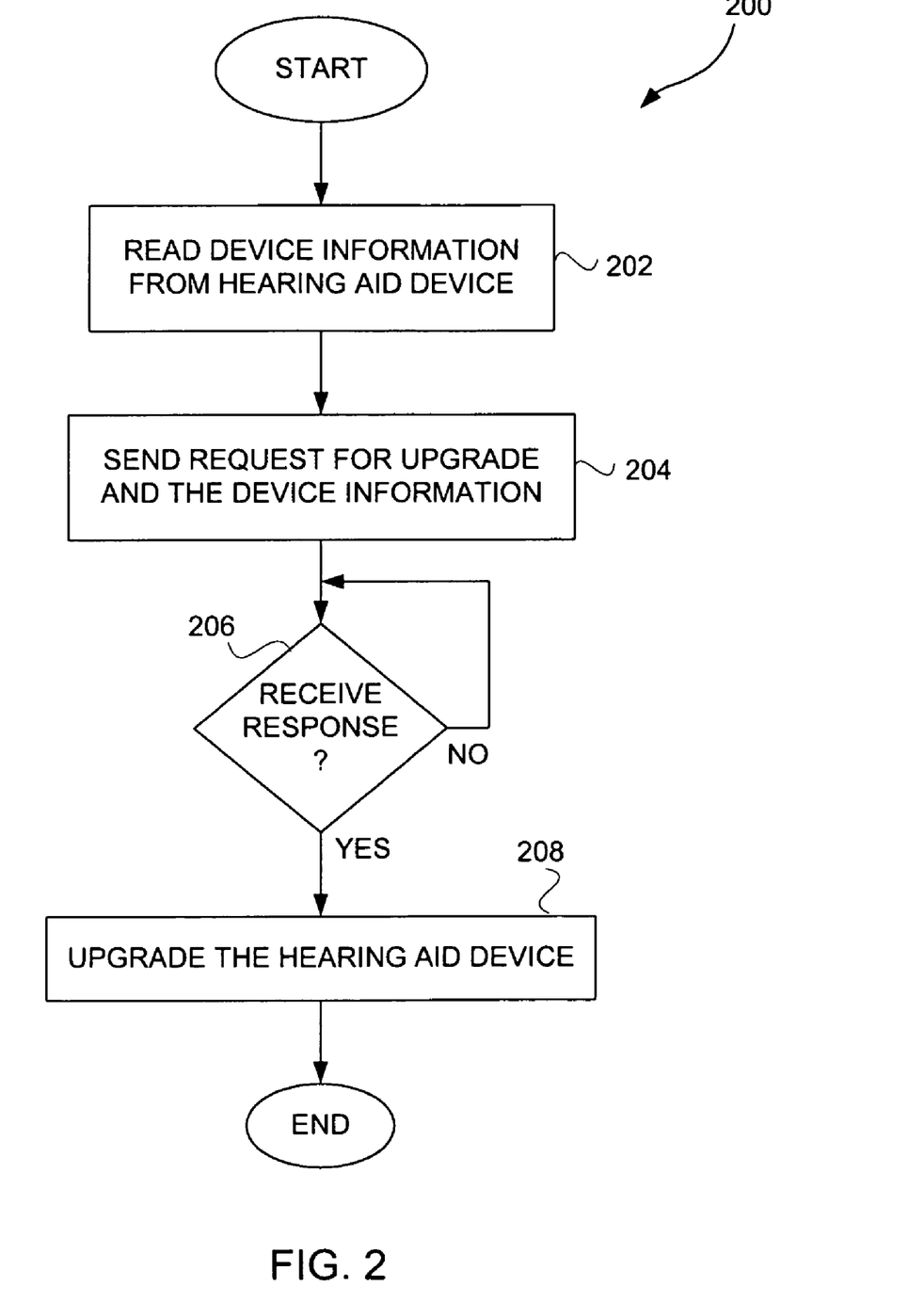
FIG. 2 is a flow diagram of client-side upgrade processing according to one embodiment of the invention.

FIG. 2 is a flow diagram of client-side upgrade processing 200 according to one embodiment of the invention. The client-side upgrade processing 200 operates to upgrade the functionality or operation of a hearing aid device, namely, a digital hearing aid device. The client-side upgrade processing 200 is, for example, performed by the hearing aid programming device 102 and the client machine 104 illustrated in FIG. 1.

The client-side upgrade processing 200 initially reads 202 device information from a hearing aid device. Typically, the device information is read 202 by a hearing aid programming device that couples to the hearing aid device. As an example, the device information can indicate a serial number and model number for the hearing aid device. The device information can also indicate a version or type of software resource presently utilized by the hearing aid device. A request for upgrade (upgrade request) and the device information are then sent 204 to an upgrade server. As an example, the upgrade server is the hearing aid upgrade server machine 108 illustrated in FIG. 1.

Next, a decision 206 determines whether a response has been received. Here, after the request is sent 204, the client-side upgrade processing 200 awaits a response from the upgrade server. Once the decision 206 determines that a response has been received, then the hearing aid device is upgraded 208. Here, the response includes the software resources that are to be utilized to upgrade 208 the hearing aid device. In one embodiment, the hearing aid device can be upgraded by programming (or writing) the software resources provided with the response into the hearing aid device. The programming of the software resources into the hearing aid device can be performed by a hearing aid programming device that couples to the hearing aid device. After the hearing aid device has been upgraded 208, the client-side upgrade processing 200 is complete and ends.

Figure 3:
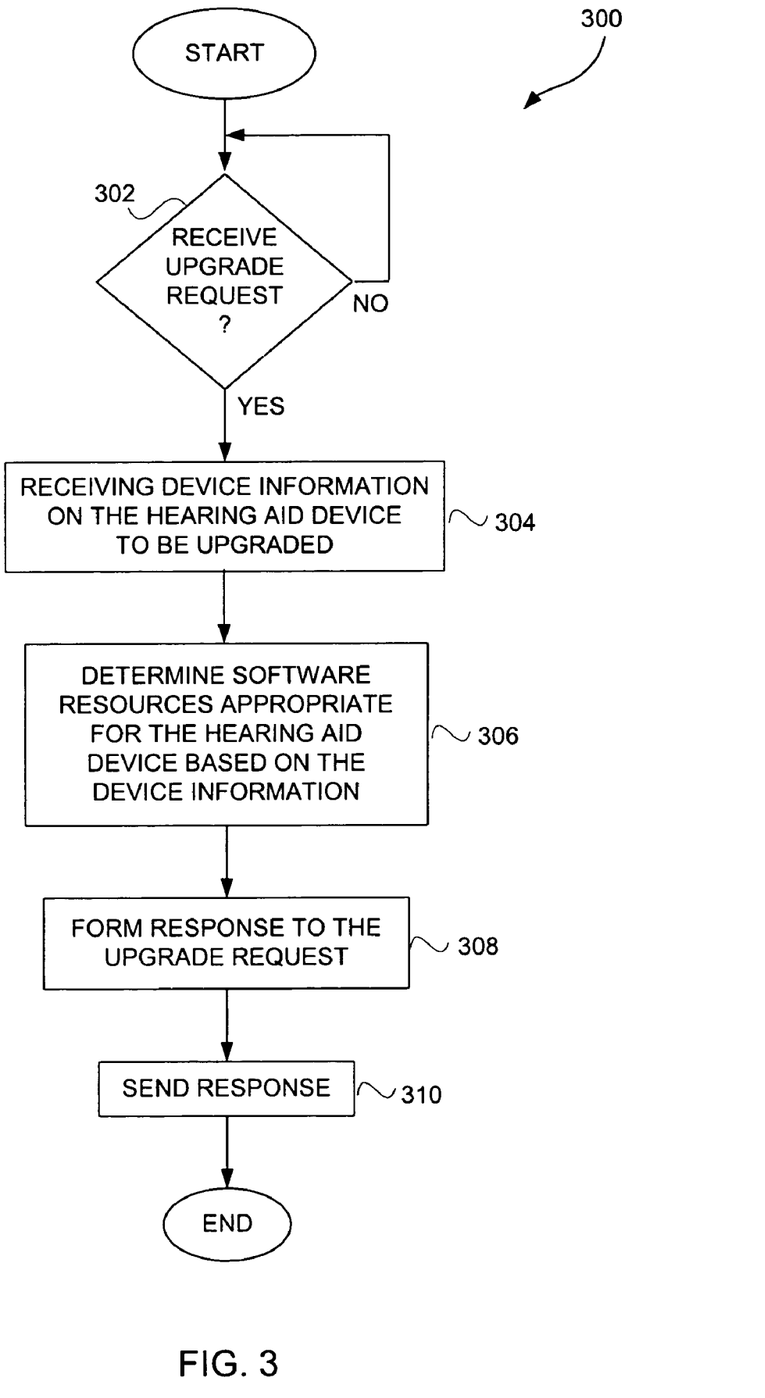
FIG. 3 is a flow diagram of server-side upgrade processing according to one embodiment of the invention.

FIG. 3 is a flow diagram of server-side upgrade processing 300 according to one embodiment of the invention. The server-side upgrade processing 300 represents the server-side counterpart to the client-side upgrade processing 200 illustrated in FIG. 2. The server-side upgrade processing 300 is, for example, performed by the hearing aid upgrade server machine 108 illustrated in FIG. 1.

The server-side upgrade processing 300 begins with a decision 302 that determines whether an upgrade request has been received. When the decision 302 determines that an upgrade request has not yet been received, the server-side upgrade processing 300 awaits such a request. Once the decision 302 determines that an upgrade request has been received, the device information for the hearing aid device to be upgraded is received 304. The device information for the hearing aid device can be received 304 with the upgrade request or subsequently received.

Next, software resources (e.g., upgrade software) that are appropriate for the hearing aid device are determined 306 based on the device information. Here, the upgrade server can support various different upgrades to various different hearing aid devices. For example, hearing aid devices with different manufacturers or models will often require different software resources. Hence, through use of the device information, the upgrade server is able to determine the software resources that are appropriate for the particular hearing aid device.

After the software resources that are appropriate for the hearing aid device have been determined 306, a response to the upgrade request is formed 308. Typically, the response will include the software resources that have been determined 306 to be appropriate for the hearing aid device. The response may also include some or all of the device information for the hearing aid device. Next, the response is sent 310. Here, the response is returned to the originator of the upgrade request. For example, the response is sent 310 to the client machine 104 illustrated in FIG. 1.

Figure 4A:
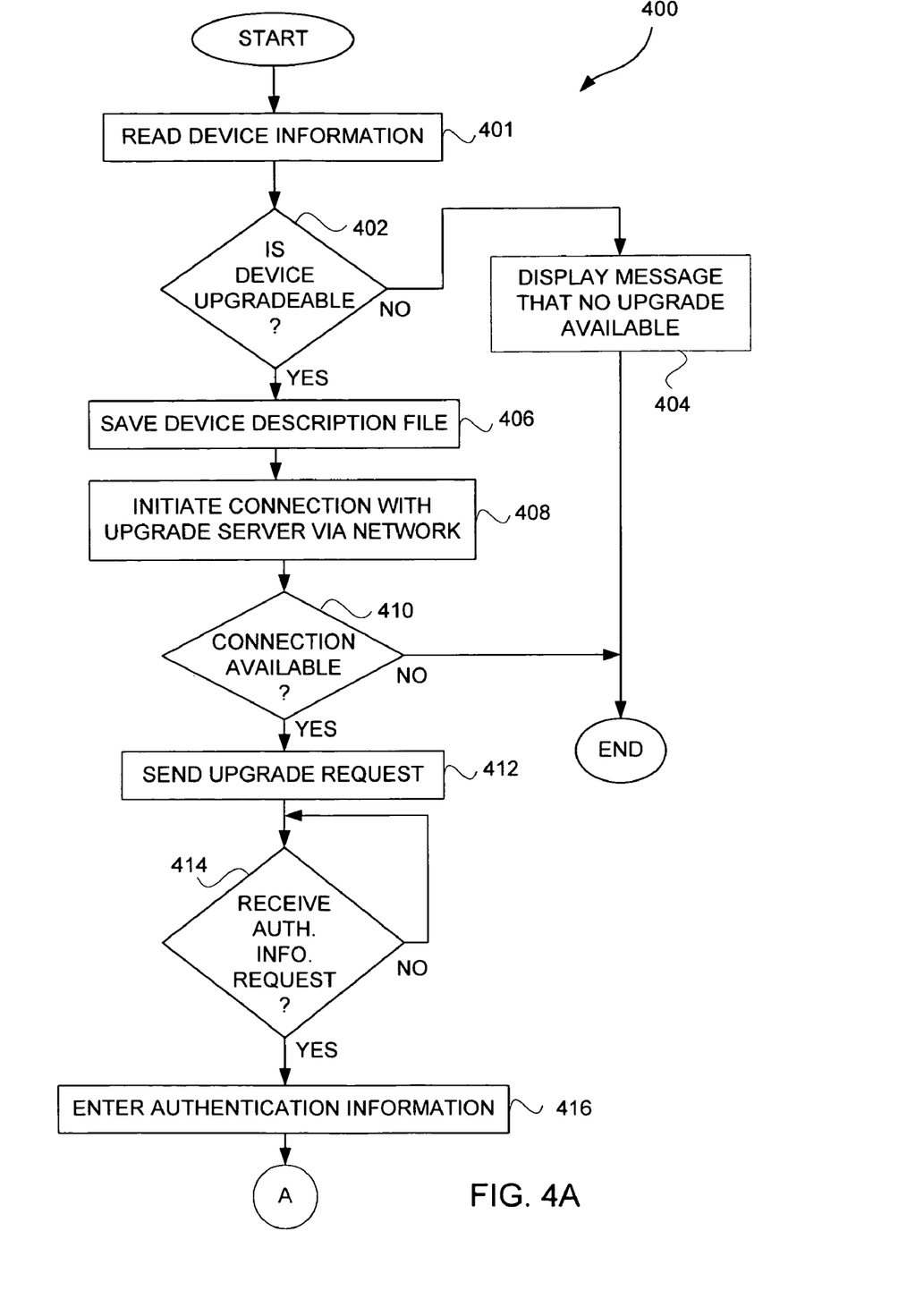
FIGS. 4A–4C are flow diagrams of client-side hearing aid upgrade processing according to one embodiment of the invention.
Figure 4B:
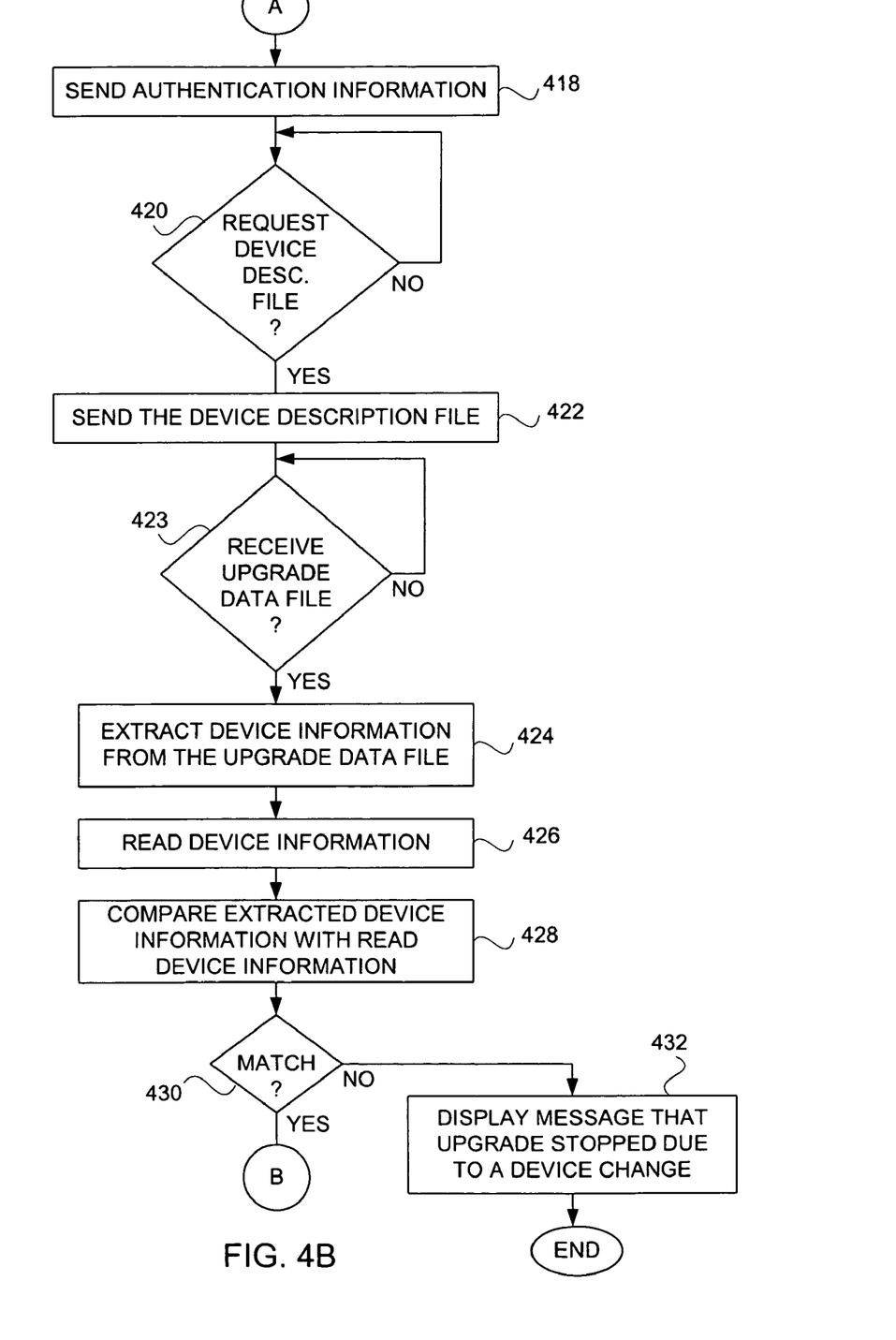
Figure 4C:
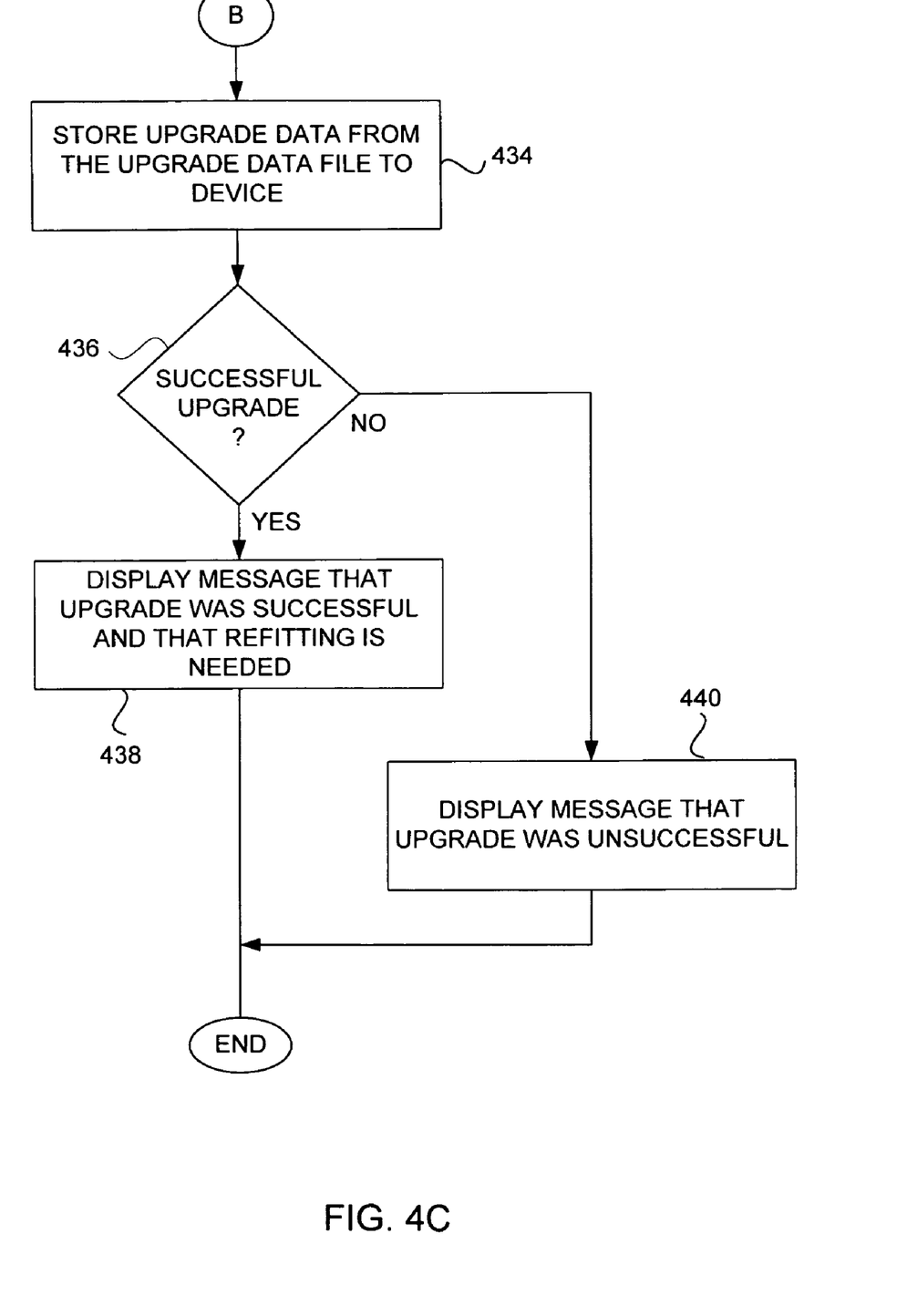

FIGS. 4A–4C are flow diagrams of client-side hearing aid upgrade processing 400 according to one embodiment of the invention. The client-side hearing aid upgrade processing 400 is, for example, performed by a client machine. The client machine can, for example, be the client machine 104 and/or the hearing aid programming device 102 illustrated in FIG. 1.

The client-side hearing aid upgrade processing 400 initially reads 401 device information. The device information pertains to a programmable hearing aid. Next, a decision 402 determines whether the programmable hearing aid device is upgradeable. Here, different models and different manufacturers of hearing aids are upgraded differently depending upon their current software and their capability to be upgraded. When the decision 402 determines that the programmable hearing aid is not upgradeable, then a message can be displayed 404 that informs the user (i.e., hearing aid dispenser) that no upgrade is available. As an example, a display device associated with the client machine 104 can display the message to the user. Following the operation 404, the client-side hearing aid upgrade processing 400 is complete and ends with no upgrade being performed.

On the other hand, when the decision 402 determines that the programmable hearing aid device is upgradeable, then a device description file can be saved 406 for subsequent retrieval. A connection with the upgrade server can then be initiated 408 via a network. In one embodiment, the network can include the Internet. The Internet is a data network of globally interconnected computers. A decision 410 then determines whether connection is available with the upgrade server. When the decision 410 determines that a connection is not available with the upgrade server, then the client-side hearing aid upgrade processing 400 is complete and ends with no upgrade being performed. Alternatively, when the decision 410 determines that a connection has been established with the upgrade server, then an upgrade request is sent 412 to the upgrade server. Here, the upgrade request is sent from the client machine to the upgrade server using the connection that has been established.

Next, a decision 414 determines whether an authentication information request has been received. Here, the client-side hearing aid upgrade processing 400 awaits to receive an authentication information request from the upgrade server. Once the decision 414 determines that an authentication information request has been received, authentication information is then entered 416. Here, the user (e.g., hearing aid dispenser) can enter the authentication information. As an example, the authentication information entered can be a user name and password. After the authentication information has been entered 416, the authentication information is sent 418 to the upgrade server.

Next, a decision 420 determines whether a device description file request has been received. When the decision 420 determines that a device description file request has not yet been received, the client-side hearing aid upgrade processing 400 awaits such a request. Once the decision 420 determines that a device description file request has been received, the device description file is sent 422 to the upgrade server.

Thereafter, a decision 423 determines whether an upgrade data file has been received. When the decision 423 determines that an upgrade data file has not yet been received, the client-side hearing aid upgrade processing 400 awaits such a file. Once the decision 423 determines that an upgrade data file has been received, device information is extracted 424 from the upgrade data file. In this embodiment, it is assumed that the upgrade data file includes not only upgrade data but also device information; however, the device information could, in other embodiments, be provided separate from the upgrade data.

At this point, device information is read 426 from the programmable hearing aid. Then, the extracted device information is compared 428 with the read device information. A decision 430 then determines whether a match is present. When the decision 430 determines that the extracted device information does not match the read device information, then a message can be displayed 432 that indicates that upgrade processing stopped due to a device change. Here, if the programmable hearing aid originally coupled to the client machine (e.g., hearing aid programming device) when the processing began was changed to a different hearing aid device when the upgrade information was returned to the client machine, then upgrade processing is prevented so that erroneous upgrading does not occur with respect to a hearing aid device for which such is not intended or appropriate. In addition to displaying a message, the upgraded data file (and any device information extracted therefrom) can be deleted at operation 432, so that such is not able to be used by the client machine. Following the operation 432, the client-side hearing aid upgrade processing 400 is complete and ends with no upgrade having been performed.

On the other hand, when the decision 430 determines that a match is present, namely, the extracted device information matches the read device information, the upgrade data from the upgrade data file can be stored 434 to the programmable hearing aid device. Here, the upgrade data is typically software resources in the form of programming code that are stored to the programmable hearing aid device. Once the upgrade data is stored to the programmable hearing aid device, the device functions in accordance with the upgraded functionality. The programmable hearing aid device can also be referred to as a digital hearing aid.

Next, a decision 436 determines whether the upgrade has been successful. When the decision 436 determines that the upgrade has been successful, then a message can be displayed 438 to indicate that the upgrade processing was successful and that refitting of the hearing aid device is needed. The refitting of the hearing aid device is recommended at this point because the characteristics and operation of the hearing aid device have been altered (upgraded) by the software resources stored therein. Alternatively, when the decision 436 determines that the upgrade has failed, then a message can be displayed 440 to indicate that the upgrade was unsuccessful. Following the operations 438 and 440, the client-side hearing aid upgrade processing 400 is complete and ends.

Figure 5A:
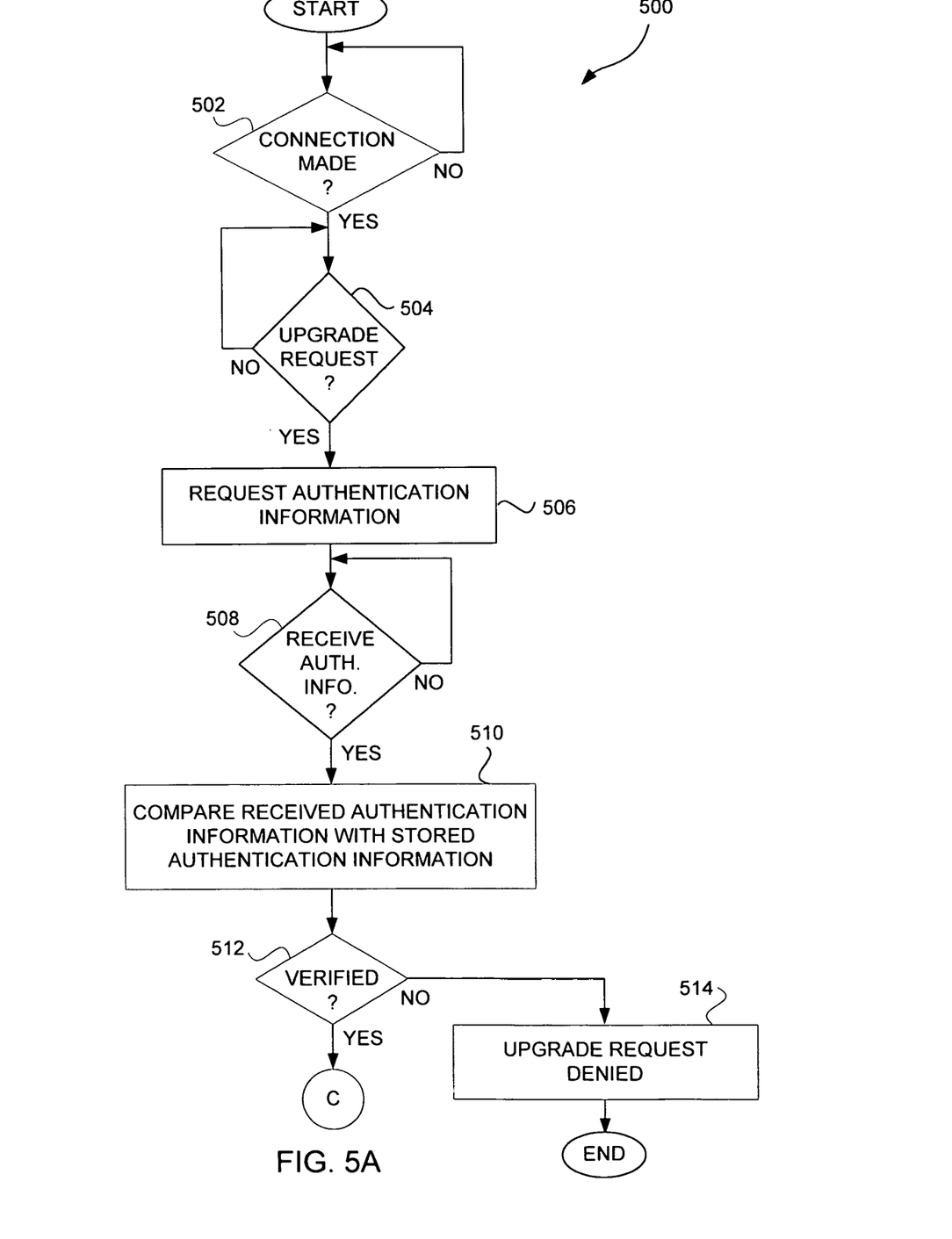
FIGS. 5A and 5B are flow diagrams of server-side hearing aid upgrade processing according to one embodiment of the invention.
Figure 5B:
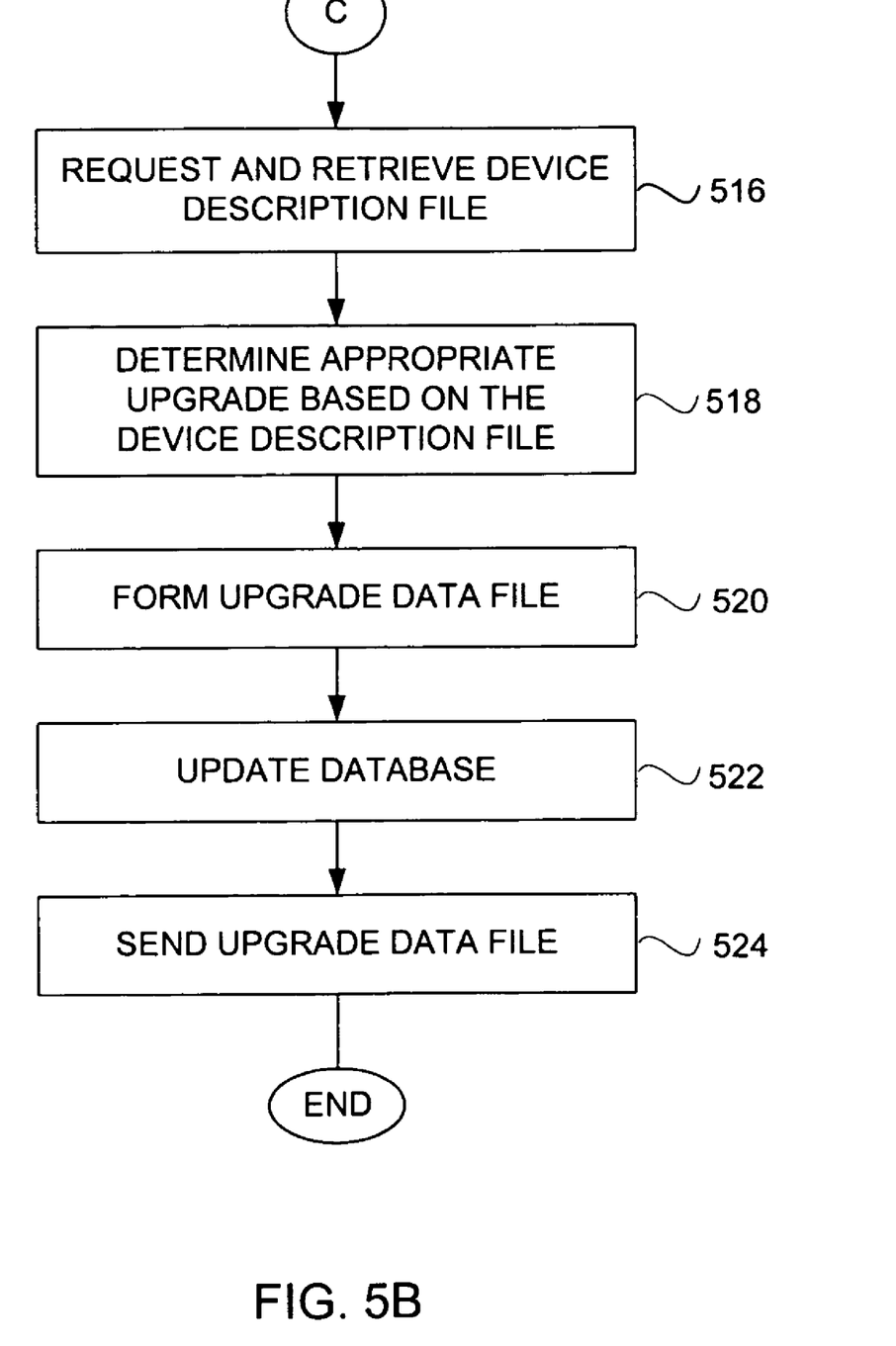

FIGS. 5A and 5B are flow diagrams of server-side hearing aid upgrade processing 500 according to one embodiment of the invention. The server-side hearing aid upgrade processing 500 represents the server-side counterpart to the client-side hearing aid upgrade processing 400 illustrated in FIGS. 4A–4C. The server-side hearing aid upgrade processing 500 is, for example, performed by an upgrade server, such as the hearing aid upgrade server machine 108 illustrated in FIG. 1.

The server-side hearing aid upgrade processing 500 begins with a decision 502 that determines whether a connection has been made. Here, the decision 502 determines whether a connection has been made with a client machine, such as the client machine 104 illustrated in FIG. 1. Once the decision 502 determines that a connection has been made, then a decision 504 determines whether an upgrade request has been received. When the decision 504 determines that an upgrade request has not yet been received, the server-side hearing aid upgrade processing 500 awaits such a request. Once the decision 504 determines that an upgrade request has been received, authentication information is requested 506.

After the authentication information is requested 506, a decision 508 determines whether authentication information has been received. The decision 508 determines whether authentication information has been received in response to the request 506 for authentication information from the client machine. In one embodiment, the authentication information is a user name and password provided to the upgrade server by a user (e.g., hearing aid dispenser) of the client machine. Once the decision 508 determines that authentication information has been received, then the received authentication information is compared 510 with stored authentication information. In one embodiment, the stored authentication information is previously provided authentication information that is stored in a database within or operatively coupled to the upgrade server.

A decision 512 then determines whether the user is verified. Here, the user is verified when the received authentication information matches the stored authentication information. Hence, when the decision 512 determines that the user is not verified, then the upgrade request is denied 514. This allows only authorized personnel to perform upgrades to hearing aid devices. After the operation 514, the server-side hearing aid upgrade processing 500 is complete and ends.

On the other hand, when the decision 512 determines that the requester is verified, then the server-side hearing aid upgrade processing 500 can continue. When the processing continues, the device description file is requested and retrieved 516. Here, the device description file is resident on the client machine and is retrieved by the upgrade server. Note that the client-side hearing aid upgrade processing 400 previously saved 406 the device description file for its subsequent retrieval. Then, an appropriate upgrade is determined 518 based on the device description file. Here, the appropriate upgrade for a given programmable hearing aid device is dependent upon its characteristics. Once the appropriate upgrade has been determined 518, an upgrade data file is formed 520. In one embodiment, the upgrade data file includes upgrade data as well as device information from the device description file. A database containing user or device information can also be updated 522. The database can also be used to store device characteristics and status information as well as administrative information (e.g., usage, billing charges, service limitations, etc.) for the hearing aid device. The upgraded data file is also sent 524 to the client machine. Once the upgraded data file has been sent 524, the upgrade request has been fully processed at the upgrade server. Following the operation 524, the server-side hearing aid upgrade processing 500 is complete and ends.

The preceding discussion largely pertains to programming a single hearing aid device. Since a hearing impaired person often has two hearing aid devices (i.e., left and right devices), the upgrade processing can upgrade both at the same time—either with the same or different software resources. Typically, each hearing aid device will have its own device information. Thus, in general, one or more hearing aid devices can be upgraded by the invention.

Given that the new software and upgrading process can both be considered to be proprietary properties, the invention can require permission or validation in order to perform an upgrade. The manufacture or developer may also need or desire to control or to be acknowledged as to the state of upgrading process. Hence, the invention can prevent piracy or prevent illegal copying of the upgrade software to unauthorized devices. The invention thus can impose real-time server verification of both the user and the devices. For example, each upgrade request can involve a login to the upgrade server. For example, the checking of the device identity before server connection and before downloading the new software to the device can make the upgrading very secure. Device verification also prevents the potential problem of upgrading to a wrong device.

The invention is also easy to use for hearing aid dispensers who fit patients with hearing aids. They can use often use their existing setup with an additional connection to the Internet. More importantly, after the new software upgrade is performed, the hearing aid dispenser can immediately test the new functions and fit the hearing aid to the patient. This unification of upgrading and fitting greatly improves the efficiency and economic aspects for all parties involved, such as the hearing aid wearer, hearing aid dispenser, and hearing aid manufacturer.

The systems and processing as discussed above are particularly well suited for use in hearing aids or other audio systems for those that are hearing impaired.

The invention can be implemented in firmware, software, hardware, or a combination of firmware, software, and hardware. The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield one or more of the following advantages. One advantage of the invention is that hearing aid devices can easily be upgraded without having to alter the hardware of the hearing aid devices. Another advantage of the invention is that hearing aid devices can be upgraded from any location and at any time. Still another advantage of the invention is that upgrading is secure and controlled so that only authorized persons are able to perform upgrading of hearing aid devices. Yet another advantage of the invention is that upgrading is controlled so that hearing aid devices are upgraded appropriately.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for upgrading a hearing aid device, said method comprising:
    (a) reading device information from the hearing aid device, the device information including at least a model indication and a serial number;
    (b) sending the device information to a hearing aid upgrade server via a network;
    (c) subsequently receiving upgrade data from the hearing aid upgrade server via the network, the upgrade data being obtained at the hearing aid upgrade sewer based on the device information; and
    (d) upgrading the hearing aid device based on the upgrade data.

2. A method as recited in claim 1, wherein said upgrading (d) comprises programming the hearing aid device in accordance with the upgrade data.

3. A method as recited in claim 2,
    wherein said method is performed by a local programming station that operatively connects to the hearing aid upgrade sewer via the network, and
    wherein the local programming station is operatively connected to the hearing aid device.

4. A method as recited in claim 3, wherein the local programming station is provided at a hearing aid dispensing office.

5. A method as recited in claim 1, wherein the hearing aid device comprises a reprogrammable memory, and
    wherein said upgrading (d) comprises programming the reprogrammable memory of the hearing aid device.

6. A method as recited in claim 5, wherein said programming of the reprogrammable memory operates to store an algorithm in the hearing aid device, the algorithm being used to enhance sound signals for a user of the bearing aid device.

7. A method as recited in claim 6, wherein the network is the Internet and wherein said method is implemented by a computer.

8. A method as recited in claim 1, wherein the network is the Internet.

9. A method as recited in claim 1, wherein said method is implemented by a computer.

10. A method for upgrading a hearing aid device, said method comprising:
    connecting the hearing aid device to a bearing aid programming system;
    electronically reading device information from the hearing aid device to the hearing aid programming system, the device information including at least a model indication and a serial number;
    coupling the hearing aid programming system to a remote hearing aid upgrade server through a network;
    requesting upgraded software for the hearing aid device from the remote hearing aid upgrade server based on the device information;
    receiving, at the hearing aid programming system, upgraded software for the hearing aid device from the remote hearing aid upgrade server through the network; and
    installing the upgraded software for the hearing aid device in the hearing aid device, whereby the hearing aid device thereafter operates in accordance with the upgraded software.

11. A method as recited in claim 10, wherein said method further comprises:
    determining whether the hearing aid device is suitable for upgrade based on die device information.

12. A method as recited in claim 10, wherein said method further comprises
   entering at least a password into the bearing aid programming system; and
   validating the password at the remote hearing aid upgrade server.

13. A method as recited in claim 12, wherein said validating of the password must be successful in order for said receiving of the upgraded software to be performed.

14. A method as recited in claim 10, wherein the hearing aid device comprises a reprogrammable memory, and
   wherein said installing comprises programming the reprogrammable memory of the hearing aid device in accordance with the upgraded software.

15. A method as recited in claim 14, wherein said programming of the reprogrammable memory operates to store the upgraded software in the hearing aid device, the upgraded software being used to enhance sound signals for a user of the hearing aid device.

16. A method as recited in claim 10, wherein the network is the Internet.

17. A method as recited in claim 10, wherein said reading is performed by electronically reading the device information.

18. A method as recited in claim 10, wherein said requesting of the upgraded software sends the device information to the remote hearing aid upgrade server.

19. A method as recited in claim 18,
   wherein said receiving comprises receiving returned device information from the remote hearing aid upgrade server through the network, and
   wherein said installing operates to install the upgraded software in the bearing aid device only when the device information obtained by said reading matches the returned device information.

20. A method as recited in claim 10, wherein said method further comprises:
   displaying a notification message that the hearing aid device has been modified such that refitting is needed.

21. A method for providing software to upgrade a hearing aid device from a remote hearing aid server, said method comprising:
   receiving a request from a requesting machine to upgrade software for the hearing aid device;
   receiving device information for the hearing aid device from the requesting machine;
   determining appropriate upgraded software for the hearing aid device based on the device information;
   sending the appropriate upgraded software to the requesting device;
   sending returned device information to the requesting device;
   comparing the returned device information with the device information for the heating aid device available from said receiving of the device information; and
   thereafter upgrading the hearing aid device in accordance with the appropriate upgraded software provided to the requesting device when said comparing indicates that the returned device information matches the device information for the hearing aid device.

22. A method as recited in claim 21, wherein the device information is electronically read from the hearing aid device.

23. A method as recited in claim 21, wherein the device information comprises at least a model indication and a serial number.

24. A method as recited in claim 21,
   wherein said comparing is performed at the requesting device, and
   wherein said updating of the hearing aid device is prevented when said comparing indicates that the returned device information does not match the device information for the hearing aid device available from said receiving of the device information.

25. A method as recited in claim 21, wherein said method further comprises:
   receiving a password provided by a requestor at the requesting device and validating the requestor based on the received password.

26. A method as recited in claim 25, wherein said method further comprises:
   preventing said sending of the appropriate upgraded software to the requesting device when said validating indicates that the requestor is not validated.

27. A computer readable medium including at least computer program code for upgrading a hearing aid device, said computer readable medium comprising:
   computer program code for reading device information from the hearing aid device, the device information including at least a model indication and a serial number;
   computer program code for sending die device information to a hearing aid upgrade server via a network;
   computer program code for subsequently receiving upgrade data from the hearing aid upgrade server via the network, the upgrade data being obtained at the hearing aid upgrade server based on the device information;
   computer program code for sending returned device information to the requesting device;
   computer program code for comparing the returned device information with the device information for the hearing aid device available from said receiving of the device information; and
   computer program code for upgrading the hearing aid device based on the upgrade data provided that said comparing indicates that the returned device information matches the device information for the hearing aid device.

28. A computer readable medium including at least computer program code for upgrading a hearing aid device, said computer readable medium comprising:
   computer program code for connecting the hearing aid device to a hearing aid programming system;
   computer program code for electronically reading device information from the hearing aid device to the hearing aid programming system, the device information including at least a model indication and a serial number;
   computer program code for coupling the hearing aid programming system to a remote hearing aid upgrade server through a network;
   computer program code for requesting upgraded software for the hearing aid device from the remote hearing aid upgrade server based on the device information;
   computer program code for receiving, at the hearing aid programming system, upgraded software for the hearing aid device from the remote hearing aid upgrade server through the network; and
   computer program code for installing the upgraded software for the hearing aid device in the hearing aid device, whereby the hearing aid device thereafter operates in accordance with the upgraded software.

29. A computer readable medium including at least computer program code for upgrading a hearing aid device from a remotely located hearing aid server, said computer readable medium comprising:

- computer program code for receiving a request from a requesting machine to upgrade the hearing aid device;
- computer program code for receiving device information for the hearing aid device from the requesting machine, the received device information including at least a model indication and a serial number;
- computer program code for determining appropriate upgrade data for the hearing aid device based on the device information; and
- computer program code for sending the appropriate upgrade data to the requesting device;
- computer program code for sending returned device information to the requesting device;
- computer program code for comparing the returned device information with the received device information for the hearing aid device; and
- computer program code for thereafter upgrading the hearing aid device in accordance with the appropriate upgraded software provided to the requesting device when the returned device information matches the received device information for the hearing aid device.

30. A hearing aid upgrade server apparatus, comprising:

- means for receiving a request from a requesting machine to upgrade software for the hearing aid device;
- means for receiving device information for the hearing aid device from the requesting machine, the device information including at least a model indication and a serial number;
- means for determining appropriate upgraded software for the hearing aid device based on the device information; and
- means for sending the appropriate upgraded software to the requesting device, whereby the appropriate upgraded software is thereafter installed on the hearing aid device.

31. A hearing aid upgrade server apparatus as recited in claim 30, wherein said apparatus further comprises:

- means for authenticating a requestor initiating the request from the requesting machine.

* * * * *